(12) United States Patent
Wu et al.

(10) Patent No.: US 11,600,127 B2
(45) Date of Patent: Mar. 7, 2023

(54) SYSTEMS AND METHODS FOR CONTROLLING ACCESS TO AN ENTRANCE

(71) Applicant: ZHEJIANG DAHUA TECHNOLOGY CO., LTD., Zhejiang (CN)

(72) Inventors: Yiping Wu, Hangzhou (CN); Yunbin Wu, Hangzhou (CN); Jianming Wang, Hangzhou (CN); Xin Zeng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/334,792

(22) Filed: May 30, 2021

(65) Prior Publication Data

US 2021/0287470 A1    Sep. 16, 2021

Related U.S. Application Data

(63) Continuation of application No. PCT/CN2018/124611, filed on Dec. 28, 2018.

(51) Int. Cl.
*G07C 9/26*  (2020.01)
*G07C 9/27*  (2020.01)

(52) U.S. Cl.
CPC .............. *G07C 9/26* (2020.01); *G07C 9/27* (2020.01)

(58) Field of Classification Search
CPC ..................................... G07C 9/26; G07C 9/27
See application file for complete search history.

(56) References Cited

U.S. PATENT DOCUMENTS

| 5,541,585 A | 7/1996 | Duhame et al. |
| 6,657,538 B1 | 12/2003 | Ritter |

(Continued)

FOREIGN PATENT DOCUMENTS

| CN | 104732335 A | 6/2015 |
| CN | 105096424 A | 11/2015 |

(Continued)

OTHER PUBLICATIONS

International Search Report in PCT/CN2018/124611 dated Sep. 20, 2019, 4 pages.

(Continued)

*Primary Examiner* — Nabil H Syed
(74) *Attorney, Agent, or Firm* — Metis IP LLC

(57) ABSTRACT

A method for controlling access to an entrance may include receiving, via a network from a user terminal associated with a user, identity information and biological information related to the user. The method may also include obtaining a first determination whether the identity information matches the biological information. The method may also include obtaining a second determination whether the identity information has been registered in response to a result that the identity information matches the biological information. The method may also include transmitting the biological information to one or more authorization devices to provide a permission to the user in response to a result that the identity information has been registered. The permission may permit the user to access the entrance by inputting the biological information related to the user through one of the one or more authorization devices.

20 Claims, 5 Drawing Sheets

(56) References Cited

U.S. PATENT DOCUMENTS

| | | | |
|---|---|---|---|
| 7,170,998 B2 | 1/2007 | McLintock et al. | |
| 8,577,394 B2 | 11/2013 | Cheung et al. | |
| 9,509,688 B1* | 11/2016 | Magi Shaashua | H04L 63/0861 |
| 11,127,236 B1* | 9/2021 | Kocher | G06K 9/00926 |
| 2006/0212717 A1* | 9/2006 | Ito | G07C 9/37 |
| | | | 713/186 |
| 2007/0168290 A1 | 7/2007 | Robinson | |
| 2008/0305835 A1 | 12/2008 | Johnstone et al. | |
| 2013/0266196 A1 | 10/2013 | Kono et al. | |
| 2014/0282945 A1* | 9/2014 | Smith | H04L 63/0861 |
| | | | 726/6 |
| 2018/0061155 A1* | 3/2018 | Ghorpade | G07C 9/00309 |
| 2018/0146374 A1 | 5/2018 | Golan et al. | |
| 2020/0065459 A1* | 2/2020 | Himabindu | G06F 21/316 |

FOREIGN PATENT DOCUMENTS

| | | |
|---|---|---|
| CN | 105262731 A | 1/2016 |
| CN | 105681278 A | 6/2016 |
| CN | 105911610 A | 8/2016 |
| CN | 105991776 A | 10/2016 |
| CN | 106204841 A | 12/2016 |
| CN | 106504375 A | 3/2017 |
| CN | 106960491 A | 7/2017 |
| CN | 107085891 A | 8/2017 |
| CN | 107230267 A | 10/2017 |
| CN | 107729852 A | 2/2018 |
| CN | 107871354 A | 4/2018 |
| CN | 107967741 A | 4/2018 |
| WO | 2017181198 A1 | 10/2017 |

OTHER PUBLICATIONS

Written Opinion in PCT/CN2018/124611 dated Sep. 20, 2019, 5 pages.

The Extended European Search Report in European Application No. 18944881.4 dated Oct. 7, 2021, 8 pages.

First Office Action in Chinese Application No. 201880100489.6 dated Jun. 30, 2022, 49 pages.

\* cited by examiner

500

```
┌─────────────────────────────────────────┐
│ Receiving, via a network from a user    │
│ terminal associated with a user,        │──── 510
│ identity information and biological     │
│ information related to the user         │
└─────────────────────────────────────────┘
                    │
                    ▼
┌─────────────────────────────────────────┐
│ Obtaining a first determination whether │──── 520
│ the identity information matches the    │
│ biological information                  │
└─────────────────────────────────────────┘
                    │
                    ▼
┌─────────────────────────────────────────┐
│ In response to a result that the        │
│ identity information matches the        │
│ biological information, obtaining a     │──── 530
│ second determination whether the        │
│ identity information has been registered│
└─────────────────────────────────────────┘
                    │
                    ▼
┌─────────────────────────────────────────┐
│ In response to a result that the        │
│ identity information has been           │
│ registered, transmitting the biological │
│ information to one or more authorization│
│ devices to provide a permission to the  │──── 540
│ user, the permission permitting the     │
│ user to access the entrance by inputting│
│ the biological information related to   │
│ the user through one of the one or more │
│ authorization devices                   │
└─────────────────────────────────────────┘
```

FIG. 5

SYSTEMS AND METHODS FOR CONTROLLING ACCESS TO AN ENTRANCE

CROSS-REFERENCE TO RELATED APPLICATIONS

This application is a Continuation of International Application No. PCT/CN2018/124611, filed on Dec. 28, 2018, the entire contents of which are hereby incorporated by reference.

TECHNICAL FIELD

The present disclosure generally relates to systems and methods for information management, and more particularly, to systems and methods for controlling access to an entrance.

BACKGROUND

With the rapid development of cities, security management of exclusive areas, such as private residences, businesses, and governments, construction sites, office buildings, laboratories, etc., is important. Only authorized persons (e.g., community residents, company staff, members of an institution) are allowed to enter these exclusive areas. Smart locks may be employed on doors or mechanical barriers at entrances of the exclusive areas to control access to the entrances, and to protect valuable contents and occupants from outside. Authorization to unlock the smart locks may be provided to the authorized people to access the entrances. When people with the authorization input into the smart locks their biological information (e.g., finger prints, facial features, eye patterns, voice characteristics, or handwriting), the smart locks then are automatically unlocked. However, how efficiently that a security system can provide such authorization is still a major concern. Thus, it is desirable to provide systems and methods with efficient authorization of access to an entrance.

SUMMARY

According to a first aspect of the present disclosure, a system for controlling access to an entrance may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may receive, via a network from a user terminal associated with a user, identity information and biological information related to the user. The one or more processors may obtain a first determination whether the identity information matches the biological information. The one or more processors may obtain a second determination whether the identity information has been registered in response to a result that the identity information matches the biological information. The one or more processors may transmit the biological information to one or more authorization devices to provide a permission to the user in response to a result that the identity information has been registered. The permission may permit the user to access the entrance by inputting the biological information related to the user through one of the one or more authorization devices.

According to another aspect of the present disclosure, a method for controlling access to an entrance may include one or more of the following operations. One or more processors may receive, via a network from a user terminal associated with a user, identity information and biological information related to the user. The one or more processors may obtain a first determination whether the identity information matches the biological information. The one or more processors may obtain a second determination whether the identity information has been registered in response to a result that the identity information matches the biological information. The one or more processors may transmit the biological information to one or more authorization devices to provide a permission to the user in response to a result that the identity information has been registered. The permission may permit the user to access the entrance by inputting the biological information related to the user through one of the one or more authorization devices.

According to yet another aspect of the present disclosure, a system for controlling access to an entrance may include a receiving module configured to receive, via a network from a user terminal associated with a user, identity information and biological information related to the user. The system may also include a matching module configured to obtain a first determination whether the identity information matches the biological information. The system may also include a verification module configured to obtain a second determination whether the identity information has been registered in response to a result that the identity information matches the biological information. The system may also include a transmission module configured to transmit the biological information to one or more authorization devices to provide a permission to the user in response to a result that the identity information has been registered. The permission may permit the user to access the entrance by inputting the biological information related to the user through one of the one or more authorization devices.

According to yet another aspect of the present disclosure, a non-transitory computer readable medium may comprise at least one set of instructions for controlling access to an entrance. The at least one set of instructions may be executed by one or more processors of a computer server. The one or more processors may receive, via a network from a user terminal associated with a user, identity information and biological information related to the user. The one or more processors may obtain a first determination whether the identity information matches the biological information. The one or more processors may obtain a second determination whether the identity information has been registered in response to a result that the identity information matches the biological information. The one or more processors may transmit the biological information to one or more authorization devices to provide a permission to the user in response to a result that the identity information has been registered. The permission may permit the user to access the entrance by inputting the biological information related to the user through one of the one or more authorization devices.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for providing a permission for permitting a user to access an entrance according to some embodiments of the present disclosure.

DETAILED DESCRIPTION

Figure 1:
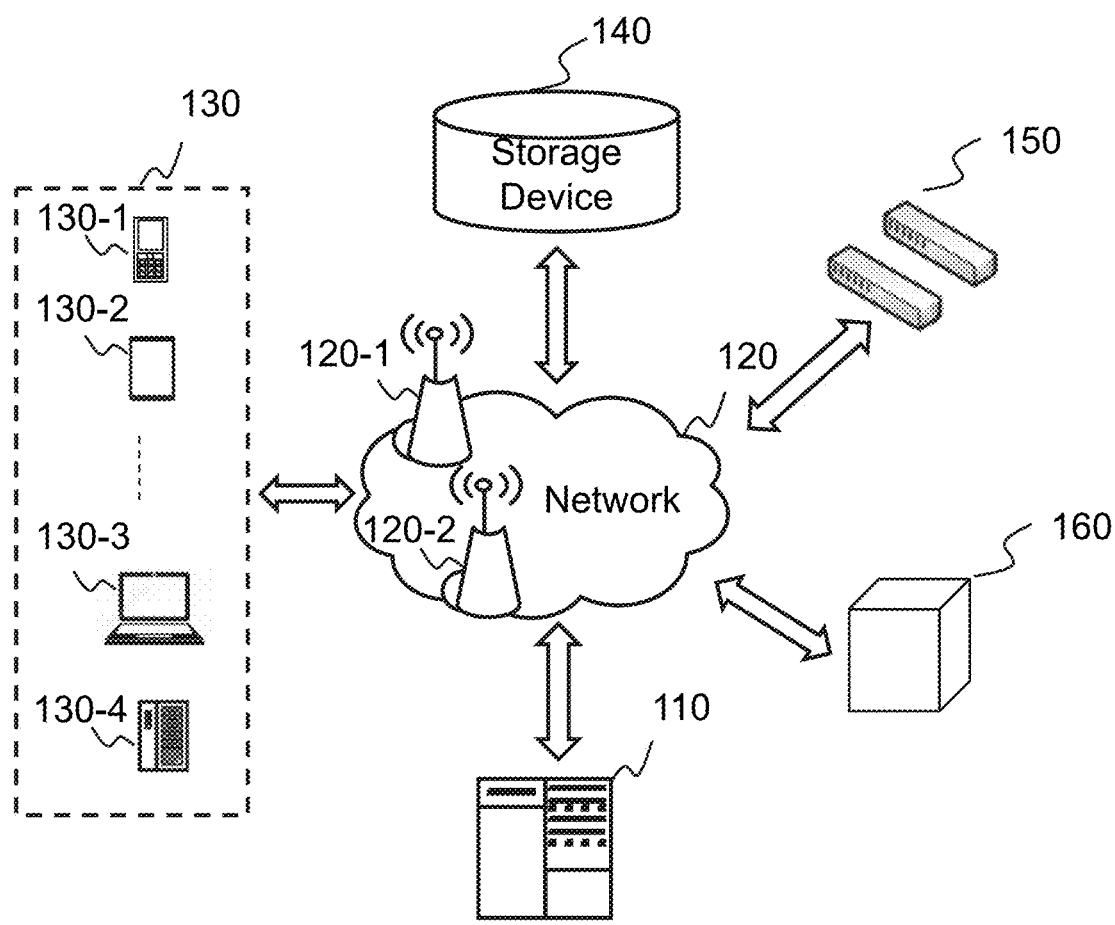
FIG. 1 is a schematic diagram illustrating an exemplary access control system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for providing authorization to a user to permit the user to access an entrance. To this end, the systems and methods may receive identity information and biological information of a user from a mobile device of the user. The user may input the identity information and the biological information through an authorization interface in the mobile device. The user may scan a quick response (QR) code, scan a barcode, open an application related to providing the authorization, or click a link to initiate the authorization interface. The systems and methods may obtain a first determination whether the identity information matches the biological information. The first determination may be determined based on a third-party database storing a large amount of data related to one-to-one correspondences between identity information and biological information of different people. The systems and methods may obtain a second determination whether the identity information has been registered in response to a result that the identity information matches the biological information. The systems and methods may transmit the biological information of the user to an authorization device in response to a result that the identity information has been registered, providing authorization to the user to permit the user to access an entrance. The user may open a smart lock in the entrance by inputting the biological information to the authorization device. In this way, through the mobile device, the user may input the identity information and the biological information anytime and anywhere, which make the inputting of the identity information and the biological information convenient and efficient. The systems and methods of the present disclosure may improve the efficiency of providing authorization to users to permit the users to access an entrance.

FIG. 1 is a schematic diagram of an exemplary access control system according to some embodiments of the present disclosure. For example, the access control system 100 may be an online platform for providing a permission (or authorization) for permitting a user to access an entrance of an exclusive area.

Specific people may be allowed to enter the exclusive area, such as private residences, businesses, and governments, construction sites, office buildings, laboratories, etc. The access control system 100 may include a processing device 110, a network 120, a user terminal 130, a storage device 140, and an authorization device 150.

The processing device 110 may process information and/or data to perform one or more functions described in the present disclosure. For example, the processing device 110 may provide a permission for permitting a user to access an entrance.

In some embodiments, the processing device 110 may be a single server or a server group. The server group may be centralized, or distributed (e.g., the processing device 110 may be a distributed system). In some embodiments, the processing device 110 may be local or remote. For example, the processing device 110 may access/transmit information and/or data in/to the user terminal 130, the storage device 140, or the authorization device 150 via the network 120. As another example, the processing device 110 may be directly connected to the user terminal 130, the storage device 140, or the authorization device 150 to access/transmit information and/or data. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 110 may be implemented on a computing device 200 having one or more components illustrated in FIG. 2 or a mobile device 300 having one or more components illustrated in FIG. 3 in the present disclosure.

In some embodiments, the processing device 110 may include one or more processing engines (e.g., single-core processing engine(s) or multi-core processor(s)). Merely by way of example, the processing device 110 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the access control system 100 (e.g., the processing device 110, the user terminal 130, the storage device 140, and/or the authorization device 150) may transmit information and/or data to other component(s) in the access control system 100 via the network 120. For example, the processing device 110 may receive identity information and biological information of a user from the user terminal 130 via the network 120. As another example, the processing device 110 may transmit the biological information to the authorization device 150 via the network 120. In some embodiments, the network 120 may be any type of wired or wireless network, or combination thereof. Merely by way of example, the network 120 may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, a long range radio (LoRa) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the access control system 100 may be connected to the network 120 to exchange data and/or information between them.

The user terminal 130 may be any electronic device used by a user (e.g., community residents, company staff, organization members) associated with the access control system 100. In some embodiments, the user terminal 130 may be a mobile device 130-1, a tablet computer 130-2, a laptop computer 130-3, a desktop computer 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, the desktop computer 130-4 may be an onboard computer, an onboard television, etc.

In some embodiments, the user terminal 130 may be a device with positioning technology for locating the position of the passenger and/or the user terminal 130. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

In some embodiments, the user terminal 130 may further include at least one network port. The at least one network port may be configured to send information to and/or receive information from one or more components in the access control system 100 (e.g., the processing device 110, the storage device 140) via the network 120. In some embodiments, the user terminal 130 may be implemented on a computing device 200 having one or more components illustrated in FIG. 2, or a mobile device 300 having one or more components illustrated in FIG. 3 in the present disclosure.

The storage device 140 may store data and/or instructions. For example, the storage device 140 may store data obtained from the user terminal 130 (e.g., identity information and/or biological information of a user). As another example, the storage device 140 may store data obtained from the processing device 110 (e.g., authorized biological information). As further another example, the storage device 140 may store data and/or instructions that the processing device 110 may execute or use to perform exemplary methods described in the present disclosure. In some embodiments, the storage device 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage device 140 may include at least one network port to communicate with other devices in the access control system 100. For example, the storage device 140 may be connected to the network 120 to communicate with one or more components of the access control system 100 (e.g., the processing device 110, the user terminal 130, and/or the authorization device 150) via the at least one network port. One or more components in the access control system 100 may access the data or instructions stored in the storage device 140 via the network 120. In some embodiments, the storage device 140 may be directly connected to or communicate with one or more components in the access control system 100 (e.g., the processing device 110, the user terminal 130, the authorization device 150). In some embodiments, the storage device 140 may be part of the processing device 110 or the authorization device 150.

The authorization device 150 may include one or more acquisition devices, one or more processors, and one or more smart locks (not shown in FIG. 1). A door or a mechanical barrier of an entrance of an exclusive area may be equipped with the authorization device 150. In some embodiments, a user may input his/her biological information into the acquisition device. The smart lock may be automatically opened by the biological information if the user has a permission (or authorization) to access the entrance. For example, the processor may compare the input biological information with authorized biological information stored in the authorization device 150. If the processor determines that the input biological information is consistent with at least a part of the authorized biological information stored in the authorization device 150, the processor may automatically control the smart lock to be opened.

In some embodiments, the access control system 100 may communicate with the third-party database 160 via the network 120. The third-party database 160 may be provided by a third party (e.g., a police system, or a personnel account management system). The third-party database 160 may store a large amount of data related to one-to-one correspondences between identity information and biological information of different people in a certain region (e.g., a country, a province, a city, or a district). Alternatively or additionally, the one-to-one correspondences may be stored in a storage medium (e.g., the storage device 140) of the access control system 100. In some embodiments, the third-party database 160 may be similar to the storage device 140.

In some embodiments, one or more components of the access control system 100 (e.g., the processing device 110, the user terminal 130, the storage device 140, the authorization device 150) may communicate with each other in form of electronic and/or electromagnetic signals, through wired and/or wireless communication. In some embodiments, the access control system 100 may further include at least one data exchange port. The at least one exchange port may be configured to receive information and/or send information relating to identity information and/or biological information (e.g., in form of electronic signals and/or electromagnetic signals) between any electronic devices in the access control system 100. In some embodiments, the at least one data exchange port may be one or more of an antenna, a network interface, a network port, or the like, or any combination thereof. For example, the at least one data exchange port may be a network port connected to the processing device 110 to send information thereto and/or receive information transmitted therefrom. As another example, the at least one data exchange port may include one or more terminal interfaces configured to communicate with the user terminal(s) 130. As further another example, the at least one data exchange port may include one or more platform interfaces configured to communicate with the third-party database 160. In some embodiments, the at least one data exchange port or the one or more interfaces may be part of the processing device 110 (e.g., a communication port 207 shown in FIG. 2 or a communication unit 310 shown in FIG. 3).

Figure 2:
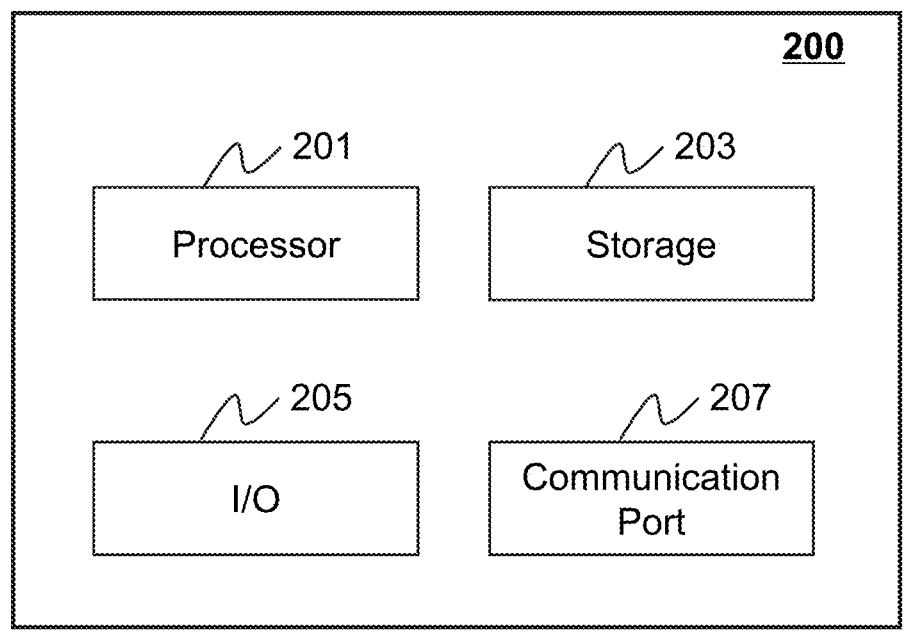
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the processing device 110, the authorization device 150, and/or the user terminal 130 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may provide a permission for permitting a user to access an entrance. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for providing a permission for permitting a user to access an entrance. As another example, the storage 203 may store identity information and/or biological information of a user.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
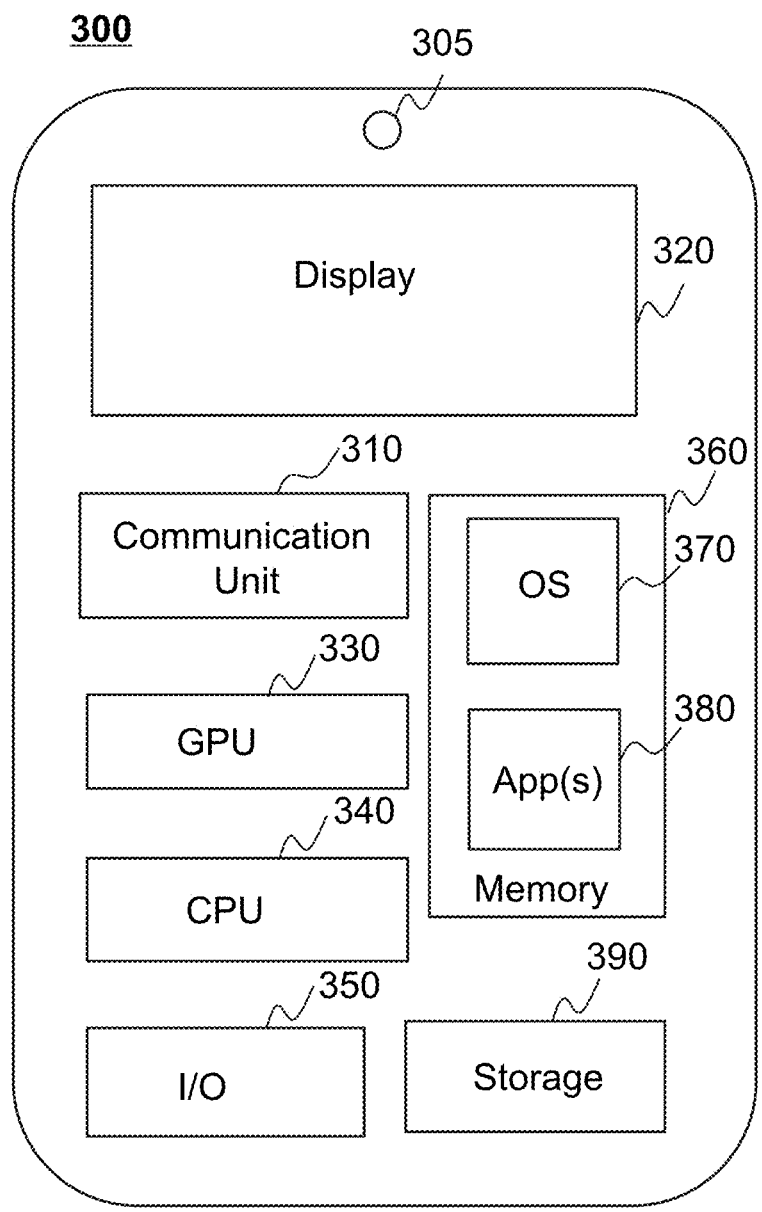
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the user terminal 130, the authorization device 150, and/or the processing device 110 may be implemented according to some embodiments of the present disclosure.

As illustrated in FIG. 3, the mobile device 300 may include a camera 305, a communication platform 310, a display 320, a graphic processing unit (GPU) 330, a central processing unit (CPU) 340, an I/O 350, a memory 360, and a storage 390. The camera 305 may be configured to perform functions for taking identification photos or facial photos of a user, and/or scanning facial features of the user. The CPU may include interface circuits and processing circuits similar to the processor 201. In some embodiments, any other suitable component, including but not limited to a system bus or a controller (not shown), may also be included in the mobile device 300. In some embodiments, a mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to managing the floating population. User interactions with the information stream may be achieved via the I/O devices 350 and provided to the processing device 110 and/or other components of the access control system 100 via the network 120.

To implement various modules, units, and their functionalities described in the present disclosure, computer hardware platforms may be used as the hardware platform(s) for one or more of the elements described herein (e.g., the access control system 100, and/or other components of the access control system 100 described with respect to FIGS. 1-5). The hardware elements, operating systems and programming languages of such computers are conventional in nature, and it is presumed that those skilled in the art are adequately familiar therewith to adapt those technologies to managing a floating population as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the access control system 100 performs, the element may perform through electrical signals and/or electromagnetic signals. For example, when a processing device 110 processes a task, such as creating a profile for a user based on the register, the processing device 110 may operate logic circuits in its processor to process such task. When the processing device 110 completes creating a profile for a user based on the register, the processor of the processing device 110 may generate electrical signals encoding the profile of the user. The processor of the processing device 110 may then send the electrical signals to at least one data exchange port of a target system associated with the processing device 110. The processing device 110 communicates with the target system via a wired network, the at least one data exchange port may be physically connected to a cable, which may further transmit the electrical signals to an input port (e.g., an information exchange port) of the user terminal 130. If the processing device 110 communicates with the target system via a wireless network, the at least one data exchange port of the target system may be one or more antennas, which may convert the electrical signals to electromagnetic signals. Within an electronic device, such as the user terminal 130, and/or the processing device 110, when a processor thereof processes an instruction, sends out an instruction, and/or performs an action, the instruction and/or action is conducted via electrical signals. For example, when the processor retrieves or saves data from a storage medium (e.g., the storage device 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
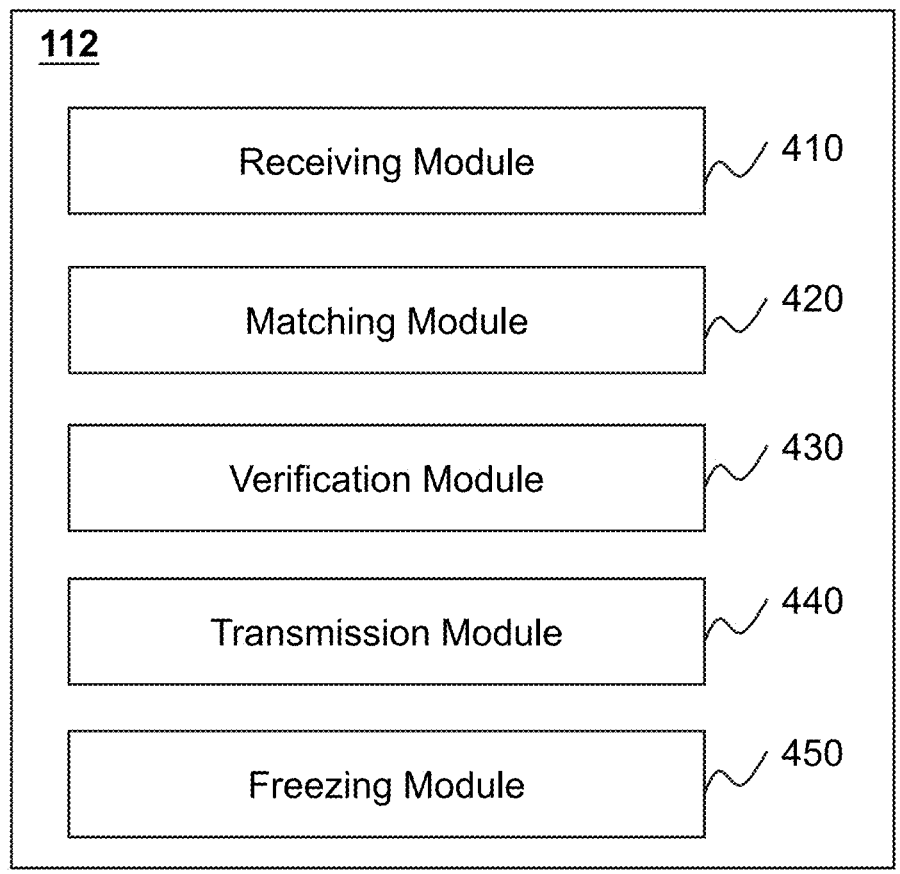
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 110 may include a receiving module 410, a matching module 420, a verification module 430, a transmission module 440, and a freezing module 450.

The receiving module 410 may receive, via the network 120 from a user terminal (e.g., the user terminal 130) associated with a user, identity information and biological information related to the user.

In some embodiments, the identity information may be information that can prove who the user is. For example, the identity information may include the identity card number, the passport number, the driving license number, or the like, or any combination thereof. In some embodiments, the biological information may reflect the user's biological features. For example, the biological information may include finger prints, facial features, eye patterns, voice characteristics, handwriting, or the like, or any combination thereof.

In some embodiments, the user may input the identity information and the biological information through an authorization interface in the user terminal 130. The authorization interface may be related to or connect to the access control system 100 via a network/wireless. For example, the user may request a permission (or authorization) for permitting the user to access an entrance of an exclusive area (e.g., private residences, businesses, and governments, construction sites, office buildings, laboratories, etc.) through the authorization interface. The authorization interface may be initiated by scanning a quick response (QR) code, scanning a barcode, opening an application associated with the access control system 100 (e.g., a property management application), or opening a link through the user terminal 130. For example, the user may use a camera (e.g., the camera 305) in the user terminal 130 to scan a QR code or a barcode to initiate the authorization interface. The QR code and/or the barcode may be printed out and be posted anywhere, such as on the authorization device 150, a security booth, or a gate of a building. As another example, the user may extract an electronic QR code or an electronic barcode in the user terminal 130 to initiate the authorization interface. As still another example, the processing device 110 may transmit a link to the user terminal 130 and the user may click the link to initiate the authorization interface. As further another example, the user may click a link in the subscription (e.g., in WeChat™) of the access control system 100 to initiate the authorization interface. As still another example, in the application, there may be an entrance of the authorization interface. The user may open the application and click the entrance to initiate the authorization interface. Through the user terminal 130, the user may online input the identity information and the biological information anytime and anywhere, instead of inputting the identity information and the biological information on site, which thereby is more convenient and efficient. In some embodiments, the user may input the identity information and the biological information through the authorization device 150. In some embodiments, the user may type the identity information or scan, for example, the user's identity card, passport, driving license to obtain the identity information.

The matching module 420 may obtain a first determination whether the identity information matches the biological information.

In some embodiments, the first determination may be determined by the matching module 420 or a third-party platform communicating with the access control system 100 based on a database storing a large amount of data related to one-to-one correspondences between identity information and biological information of different people in a certain region (e.g., a country, a province, a city, or a district). In some embodiments, the database may be a storage medium (e.g., the storage device 140) of the access control system 100 or a third-party database (e.g., the third-party database 160) communicating with the access control system 100. In some embodiments, the third-party database may be part of the third-party platform.

Merely by way of example, the matching module 420 may determine whether the identity information matches the biological information by comparing the identity information and the biological information using the one-to-one correspondences stored in the database (e.g., the storage device 140 or the third-party database 160) and generate the first determination. As another example, the receiving module 410 may transmit the received identity information and biological information to the third-party platform. The third-party platform may determine whether the identity information matches the biological information by comparing the identity information and the biological information using the one-to-one correspondences stored in the third-party database 160, and transform the first determination to the matching module 420.

In some embodiments, determining the first determination by the third-party platform and/or based on the third-party database 160 may reduce the burden of the processing device 110, which may improve the authorization efficiency.

The verification module 430 may obtain a second determination whether the identity information has been registered in response to a result that the identity information matches the biological information.

In some embodiments, a user who is a regular in the exclusive area (e.g., living in the residences, working in the buildings, being a member of an institute, etc.) may register his/her identity information with a property management company or an administrator managing the exclusive area. In some embodiments, the processing device 110 may display the registered identity information (e.g., through the I/O 205 or the display 320). An operator of the processing device 110 (e.g., the staff of the property management company or the administrator of the exclusive area) may manually compare the received identity information with the registered identity information and input the second determination to the verification module 430. In some embodiments, the registered identity information may be stored in a storage medium (e.g., the storage device 140, the storage 203, the memory 360, or the storage 390) of the access control system 100. The verification module 430 may automatically compare the received identity information with the registered identity information and generate the second determination.

The transmission module 440 may transmit the biological information to the authorization device 150 to provide a permission (or authorization) to the user in response to a result that the identity information has been registered. The permission may permit the user to access the entrance based on the inputted biological information related to the user through the authorization device 150. In some embodiments, the transmission module 440 may further transmit, to the user terminal 130 associated with the user, a notification indicating that the user succeeds in acquiring the permission to access the entrance.

In some embodiments, in response to a result that the identity information does not match the biological information or a result that the identity information has not been registered, the transmission module 440 may transmit, to the user terminal 130 associated with the user, a notification indicating that the user has failed to acquire the permission to access the entrance. In some embodiments, the transmission module 440 may further transmit a notification indicating that the identity information does not match the biological information, or a notification that the identity information has not been registered.

In some embodiments, in response to the result that the identity information does not match the biological information or the result that the identity information has not been registered, the freezing module 450 may obtain a count of times that the user failed to acquire the permission to access the entrance. The freezing module 450 may determine whether the count of times is greater than a count threshold (e.g., 3 times, 4 times, 5 times, etc.). In response to a result that the count of times is greater than the count threshold, the freezing module 450 may freeze the identity information and the biological information for a specific period of time (e.g., 1 1 day, 1 week, 1 month, 1 year, etc.). In some embodiments, the transmission module 440 may further transmit, to the user terminal 130 of the user, a notification indicating that the identity information and the biological information is frozen for a specific period of time because the count of times that the user failed to acquire the permission to access the entrance is greater than the count threshold.

For example, if the freezing module 450 freezes the identity information and the biological information of the user, when receiving the identity information and the biological information in the specific period of time, the receiving module 410 may detect that the identity information and the biological information is frozen. As a result, the processing device 110 may not perform operations 520-540. Consequently, the transmission module 440 may transmit, to the user terminal 130 of the user, a notification indicating that the identity information and the biological information is frozen for a specific period of time.

As another example, the user terminal 130 may establish a communication (e.g., wireless communication) with the processing device 110, through the authorization interface in the user terminal 130 via the network 120. The authorization interface may direct the user terminal 130 to monitor, continuously or periodically, input from the user and transmit the input to the receiving module 410 via the network 120. Consequently, the user terminal 130 may inform the receiving module 410 of the user's input in real-time or substantially real-time. As a result, when the user starts to input the identity information and/or the biological information, the receiving module 410 may, based on the inputted the identity information and/or the biological information, determine whether the identity information and/or the biological information is frozen. For example, when the user inputs all or part of the identity information, and before sending out the identity information to the receiving module 410, the receiving module 410 may have already received the identity information, and determine whether the identity information is frozen. If the receiving module 410 determines that the identity information is frozen, the transmission module 440 may transmit, to the user terminal 130 of the user, a notification indicating that the identity information is frozen for a specific period of time before the identity information is sent out to the receiving module 410. This feature can reduce a traffic and enhance efficiency of the present system.

In some embodiments, the permission (or authorization) may have a limited effective time. For example, the effective time may be a lifelong effective time, a long-term effective time (e.g., more than 1 year), or a short-term effective time (e.g., less than or equal to 1 year). In some embodiments, the transmission module 440 may transmit the authorized biological information along with an instruction indicating the effective time to direct the authorization device 150 to automatically delete the authorized biological information when the effective time is over.

In some embodiments, the verification module 430 may provide to each user a predetermined effective time (e.g., the lifelong effective time) of authorization. The predetermined effective time may be the default of the access control system 100 or be set by the operator of the access control system 100 (e.g., the staff of the property management company or the administrator of the exclusive area). In some embodiments, the effective times may be adjustable depending on different situations for different users. For example, besides the identity information of residents, the property management company of a community may register the residence type (e.g., an owner or a tenant of a house) of the residents. If the verification module 430 obtains a result that the user is a tenant, the verification module 430 may provide a permission with a short-term effective time (e.g., 1 year) to the user. Alternatively, the verification module 430 may determine the effective time based on the lease term of the user.

The modules in the processing device 110 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the receiving module 410 and the transmission module 440 may be integrated into one single module to both receive the identity information and the biological information, and transmit the authorized biological information to the user terminal 130. As another example, the receiving module 410 may be divided into the units for receiving the identity information and the biological information of the user and determining whether the received identity information and biological information is frozen, respectively. As still another example, the verification module 430 may be divided into the units for obtaining the second determination and determining the effective time of the authorization, respectively.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 110 may further include a storage module (not shown in FIG. 4). The storage module may be configured to store data generated during any process performed by any component of in the processing device 110. As another example, each of components of the processing device 110 may include a storage device. Additionally or alternatively, the components of the processing device 110 may share a common storage device.

FIG. 5 is a flowchart illustrating an exemplary process for providing a permission for permitting a user to access an entrance according to some embodiments of the present disclosure. In some embodiments, the process 500 may be implemented in the access control system 100 illustrated in FIG. 1. For example, the process 500 may be stored in a storage medium (e.g., the storage device 140, the storage 203, the memory 360, or the storage 390) as a form of instructions, and can be invoked and/or executed by the processing device 110 (e.g., the processor 201, the CPU 340, or one or more modules in the processing device 110 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 110 (e.g., the processor 201 and/or the receiving module 410) may receive, via the network 120 from a user terminal (e.g., the user terminal 130) associated with a user, identity information and biological information related to the user.

In some embodiments, the identity information may be information that can prove who the user is. For example, the identity information may include the identity card number, the passport number, the driving license number, or the like, or any combination thereof. In some embodiments, the biological information may reflect the user's biological features. For example, the biological information may include finger prints, facial features, eye patterns, voice characteristics, handwriting, or the like, or any combination thereof.

In some embodiments, the user may input the identity information and the biological information through an authorization interface in the user terminal 130. The authorization interface may be related to or connect to the access control system 100 via a network/wireless. For example, the user may request a permission (or authorization) for permitting the user to access an entrance of an exclusive area (e.g., private residences, businesses, and governments, construction sites, office buildings, laboratories, etc.) through the authorization interface. The authorization interface may be initiated by scanning a quick response (QR) code, scanning a barcode, opening an application associated with the access control system 100 (e.g., a property management application), or opening a link through the user terminal 130. For example, the user may use a camera (e.g., the camera 305) in the user terminal 130 to scan a QR code or a barcode to initiate the authorization interface. The QR code and/or the barcode may be printed out and be posted anywhere, such as on the authorization device 150, a security booth, or a gate of a building. As another example, the user may extract an electronic QR code or an electronic barcode in the user terminal 130 to initiate the authorization interface. As still another example, the processing device 110 may transmit a link to the user terminal 130 and the user may click the link to initiate the authorization interface. As further another example, the user may click a link in the subscription (e.g., in WeChat™) of the access control system 100 to initiate the authorization interface. As still another example, in the application, there may be an entrance of the authorization interface. The user may open the application and click the entrance to initiate the authorization interface. Through the user terminal 130, the user may online input the identity information and the biological information anytime and anywhere, instead of inputting the identity information and the biological information on site, which thereby is more convenient and efficient. In some embodiments, the user may input the identity information and the biological information through the authorization device 150. In some embodiments, the user may type the identity information or scan, for example, the user's identity card, passport, driving license to obtain the identity information.

In 520, the processing device 110 (e.g., the processor 201 and/or the matching module 420) may obtain a first determination whether the identity information matches the biological information.

In some embodiments, the first determination may be determined by the processing device 110 (e.g., the processor 201 and/or the matching module 420) or a third-party platform communicating with the access control system 100 based on a database storing a large amount of data related to one-to-one correspondences between identity information and biological information of different people in a certain region (e.g., a country, a province, a city, or a district). In some embodiments, the database may be a storage medium (e.g., the storage device 140) of the access control system 100 or a third-party database (e.g., the third-party database 160) communicating with the access control system 100. In some embodiments, the third-party database may be part of the third-party platform.

Merely by way of example, the processing device 110 (e.g., the processor 201 and/or the matching module 420) may determine whether the identity information matches the biological information by comparing the identity information and the biological information using the one-to-one correspondences stored in the database (e.g., the storage device 140 or the third-party database 160) and generate the first determination. As another example, the processing device 110 (e.g., the processor 201 and/or the receiving module 410) may transmit the received identity information and biological information to the third-party platform. The third-party platform may determine whether the identity information matches the biological information by comparing the identity information and the biological information using the one-to-one correspondences stored in the third-party database 160, and transform the first determination to the processing device 110 (e.g., the processor 201 and/or the matching module 420).

In some embodiments, determining the first determination by the third-party platform and/or based on the third-party database 160 may reduce the burden of the processing device 110, which may improve the authorization efficiency.

In 530, the processing device 110 (e.g., the processor 201 and/or the verification module 430) may obtain a second determination whether the identity information has been registered in response to a result that the identity information matches the biological information.

In some embodiments, a user who is a regular in the exclusive area (e.g., living in the residences, working in the buildings, being a member of an institute, etc.) may register his/her identity information with a property management company or an administrator managing the exclusive area. In some embodiments, the processing device 110 may display the registered identity information (e.g., through the I/O 205 or the display 320). An operator of the processing device 110 (e.g., the staff of the property management company or the administrator of the exclusive area) may manually compare the received identity information with the registered identity information and input the second determination to the processing device 110 (e.g., the processor 201 and/or the verification module 430). In some embodiments, the registered identity information may be stored in a storage medium (e.g., the storage device 140, the storage 203, the memory 360, or the storage 390) of the access control system 100. The processing device 110 (e.g., the processor 201 and/or the verification module 430) may automatically compare the received identity information with the registered identity information and generate the second determination.

In 540, the processing device 110 (e.g., the processor 201 and/or the transmission module 440) may transmit the biological information to the authorization device 150 to provide a permission (or authorization) to the user in response to a result that the identity information has been registered. The permission may permit the user to access the entrance based on the inputted biological information related to the user through the authorization device 150. In some embodiments, the processing device 110 (e.g., the processor 201 and/or the transmission module 440) may further transmit, to the user terminal 130 associated with the user, a notification indicating that the user succeeds in acquiring the permission to access the entrance.

In some embodiments, in response to a result that the identity information does not match the biological information or a result that the identity information has not been registered, the processing device 110 (e.g., the processor 201 and/or the transmission module 440) may transmit, to the user terminal 130 associated with the user, a notification indicating that the user has failed to acquire the permission to access the entrance. In some embodiments, the processing device 110 (e.g., the processor 201 and/or the transmission module 440) may further transmit a notification indicating that the identity information does not match the biological information, or a notification that the identity information has not been registered.

In some embodiments, in response to the result that the identity information does not match the biological information or the result that the identity information has not been registered, the processing device 110 (e.g., the processor 201 and/or the freezing module 450) may obtain a count of times that the user failed to acquire the permission to access the entrance. The processing device 110 (e.g., the processor 201 and/or the freezing module 450) may determine whether the count of times is greater than a count threshold (e.g., 3 times, 4 times, 5 times, etc.). In response to a result that the count of times is greater than the count threshold, the processing device 110 (e.g., the processor 201 and/or the freezing module 450) may freeze the identity information and the biological information for a specific period of time (e.g., 1 1 day, 1 week, 1 month, 1 year, etc.). In some embodiments, the processing device 110 (e.g., the processor 201 and/or the transmission module 440) may further transmit, to the user terminal 130 of the user, a notification indicating that the identity information and the biological information is frozen for a specific period of time because the count of times that the user failed to acquire the permission to access the entrance is greater than the count threshold.

For example, if the processing device 110 (e.g., the processor 201 and/or the freezing module 450) freezes the identity information and the biological information of the user, when receiving the identity information and the biological information in the specific period of time, the processing device 110 (e.g., the processor 201 and/or the receiving module 410) may detect that the identity information and the biological information is frozen. As a result, the processing device 110 may not perform operations 520-540. Consequently, the processing device 110 (e.g., the processor 201 and/or the transmission module 440) may transmit, to the user terminal 130 of the user, a notification indicating that the identity information and the biological information is frozen for a specific period of time.

As another example, the user terminal 130 may establish a communication (e.g., wireless communication) with the processing device 110, through the authorization interface in the user terminal 130 via the network 120. The authorization interface may direct the user terminal 130 to monitor, continuously or periodically, input from the user and transmit the input to the processing device 110 (e.g., the processor 201 and/or the receiving module 410) via the network 120. Consequently, the user terminal 130 may inform the processing device 110 (e.g., the processor 201 and/or the receiving module 410) of the user's input in real-time or substantially real-time. As a result, when the user starts to input the identity information and/or the biological information, the processing device 110 (e.g., the processor 201 and/or the receiving module 410) may, based on the inputted the identity information and/or the biological information, determine whether the identity information and/or the biological information is frozen. For example, when the user inputs all or part of the identity information, and before sending out the identity information to the processing device 110 (e.g., the processor 201 and/or the receiving module 410), the processing device 110 (e.g., the processor 201 and/or the receiving module 410) may have already received the identity information, and determine whether the identity information is frozen. If the processing device 110 (e.g., the processor 201 and/or the receiving module 410) determines that the identity information is frozen, the processing device 110 (e.g., the processor 201 and/or the transmission module 440) may transmit, to the user terminal 130 of the user, a notification indicating that the identity information is frozen for a specific period of time before the identity information is sent out to the processing device 110 (e.g., the processor 201 and/or the receiving module 410). This feature can reduce a traffic and enhance efficiency of the present system.

In some embodiments, the permission (or authorization) may have a limited effective time. For example, the effective time may be a lifelong effective time, a long-term effective time (e.g., more than 1 year), or a short-term effective time (e.g., less than or equal to 1 year). In some embodiments, the processing device 110 (e.g., the processor 201 and/or the transmission module 440) may transmit the authorized biological information along with an instruction indicating the effective time to direct the authorization device 150 to automatically delete the authorized biological information when the effective time is over.

In some embodiments, the processing device 110 (e.g., the processor 201 and/or the verification module 430) may provide to each user a predetermined effective time (e.g., the lifelong effective time) of authorization. The predetermined effective time may be the default of the access control system 100 or be set by the operator of the access control system 100 (e.g., the staff of the property management company or the administrator of the exclusive area). In some embodiments, the effective times may be adjustable depending on different situations for different users. For example, besides the identity information of residents, the property management company of a community may register the residence type (e.g., an owner or a tenant of a house) of the residents. If the processing device 110 (e.g., the processor 201 and/or the verification module 430) obtains a result that the user is a tenant, the processing device 110 (e.g., the processor 201 and/or the verification module 430) may provide a permission with a short-term effective time (e.g., 1 year) to the user. Alternatively, the processing device 110 (e.g., the processor 201 and/or the verification module 430) may determine the effective time based on the lease term of the user.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for controlling access to an entrance, comprising:
   at least one storage device storing a set of instructions; and
   at least one processor in communication with the at least one storage device, wherein when executing the set of instructions, the at least one processor is configured to perform operations including:
      monitoring, in real-time, input of a user in a user terminal;
      when the user is inputting identity information or biological information related to the user in the user terminal and before the input identity information or the input biological information is formally sent out from the user terminal,
         determining whether the identity information or the biological information is frozen;
         in response to determining that the identity information or the biological information is frozen, transmitting, to the user terminal, a notification indicating that the identity information or the biological information is frozen;
         in response to determining that the identity information and the biological information is not frozen, obtaining a first determination whether the identity information matches the biological information;
         in response to a result that the identity information matches the biological information, obtaining a second determination whether the identity information has been registered; and
         in response to a result that the identity information has been registered, transmitting the biological information, to one or more authorization devices as an authorized biological information to provide a permission to the user to access the entrance, the permission indicating a consistency between the authorized biological information and an input biological information related to the user through one of the one or more authorization devices.

2. The system of claim 1, wherein the biological information includes at least one of finger prints, facial features, eye patterns, voice characteristics, or handwriting.

3. The system of claim 1, wherein the first determination is determined based on a database including one-to-one correspondence between the identity information and the biological information.

4. The system of claim 3, wherein the database is a third-party database.

5. The system of claim 1, wherein when executing the set of instructions, the at least one processor is directed to perform additional operations including:
   automatically determining whether the identity information has been registered.

6. The system of claim 1, wherein when executing the set of instructions, the at least one processor is configured to perform additional operations including:
   transmitting, to the user terminal associated with the user, a notification indicating that the user succeeds in acquiring the permission to access the entrance.

7. The system of claim 1, wherein when executing the set of instructions, the at least one processor is configured to perform additional operations including:
   in response to a result that the identity information does not match the biological information or a result that the identity information has not been registered, transmitting, to the user terminal associated with the user, a notification indicating that the user has failed to acquire the permission to access the entrance, and/or a notification indicating that the identity information does not match the biological information, or a notification that the identity information has not been registered.

8. The system of claim 7, wherein when executing the set of instructions, the at least one processor is directed to perform additional operations including:
   in response to the result that the identity information does not match the biological information or the result that the identity information has not been registered, obtaining a count of times that the user failed to acquire the permission to access the entrance;
   determining whether the count of times is greater than a count threshold; and
   in response to a result that the count of times is greater than the count threshold, freezing the identity information and the biological information for a specific period of time.

9. The system of claim 1, wherein the user inputs the identity information and the biological information through an authorization interface in the user terminal, the interface is initiated by scanning a quick response (QR) code, scanning a barcode, opening an application, or opening a link through the user terminal.

10. A method for controlling access to an entrance implemented on a computing device having one or more processors and one or more storage devices, the method comprising:
    monitoring, in real-time, input of a user in a user terminal;
    when the user is inputting identity information or biological information related to the user in the user terminal and before the input identity information or the input biological information is formally sent out from the user terminal,
       determining whether the identity information or the biological information is frozen;
       in response to determining that the identity information or the biological information is frozen, transmitting, to the user terminal, a notification indicating that the identity information or the biological information is frozen;
       in response to determining that the identity information and the biological information is not frozen, obtaining a first determination whether the identity information matches the biological information;
       in response to a result that the identity information matches the biological information, obtaining a second determination whether the identity information has been registered; and
       in response to a result that the identity information has been registered, transmitting the biological information, to one or more authorization devices as an authorized biological information to provide a permission to the user to access the entrance, the permission indicating a consistency between the authorized biological information and an input biological information related to the user through one of the one or more authorization devices.

11. The method of claim 10, wherein the biological information includes at least one of finger prints, facial features, eye patterns, voice characteristics, or handwriting.

12. The method of claim 10, wherein the first determination is determined based on a database including one-to-one correspondence between the identity information and the biological information.

13. The method of claim 12, wherein the database is a third-party database.

14. The method of claim 10, the method further comprising:
automatically determining whether the identity information has been registered.

15. The method of claim 10, the method further comprising:
transmitting, to the user terminal associated with the user, a notification indicating that the user succeeds in acquiring the permission to access the entrance.

16. The method of claim 10, the method further comprising:
in response to a result that the identity information does not match the biological information or a result that the identity information has not been registered, transmitting, to the user terminal associated with the user, a notification indicating that the user has failed to acquire the permission to access the entrance, and/or a notification indicating that the identity information does not match the biological information, or a notification that the identity information has not been registered.

17. The method of claim 16, the method further comprising:
in response to the result that the identity information does not match the biological information or the result that the identity information has not been registered, obtaining a count of times that the user failed to acquire the permission to access the entrance;
determining whether the count of times is greater than a count threshold; and
in response to a result that the count of times is greater than the count threshold, freezing the identity information and the biological information for a specific period of time.

18. The method of claim 10, wherein the user inputs the identity information and the biological information through an authorization interface in the user terminal, the interface is initiated by scanning a quick response (QR) code, scanning a barcode, opening an application, or opening a link through the user terminal.

19. A non-transitory computer readable medium, comprising at least one set of instructions for controlling access to an entrance, wherein when executed by one or more processors of a computing device, the at least one set of instructions causes the computing device to perform a method, the method comprising:
monitoring, in real-time, input of a user in a user terminal;
when the user is inputting identity information or biological information related to the user in the user terminal and before the input identity information or the input biological information is formally sent out from the user terminal,
determining whether the identity information or the biological information is frozen;
in response to determining that the identity information or the biological information is frozen, transmitting, to the user terminal, a notification indicating that the identity information or the biological information is frozen;
in response to determining that the identity information and the biological information is not frozen, obtaining a first determination whether the identity information matches the biological information;
in response to a result that the identity information matches the biological information, obtaining a second determination whether the identity information has been registered; and
in response to a result that the identity information has been registered, transmitting the biological information, to one or more authorization devices as an authorized biological information to provide a permission to the user to access the entrance, the permission indicating a consistency between the authorized biological information and an input biological information related to the user through one of the one or more authorization devices.

20. The non-transitory computer readable medium of claim 19, wherein the biological information includes at least one of finger prints, facial features, eye patterns, voice characteristics, or handwriting.

* * * * *